(12) United States Patent
Dean

(10) Patent No.: US 11,807,383 B2
(45) Date of Patent: Nov. 7, 2023

(54) AIRCRAFT WITH HYDROGEN STORAGE TANKS

(71) Applicant: ROLLS-ROYCE plc, London (GB)

(72) Inventor: Eric W Dean, Derby (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 17/556,235

(22) Filed: Dec. 20, 2021

(65) Prior Publication Data

US 2022/0227497 A1 Jul. 21, 2022

(30) Foreign Application Priority Data

Jan. 19, 2021 (GB) ...................................... 2100665

(51) Int. Cl.
*B64D 37/04* (2006.01)
*B64C 7/00* (2006.01)

(52) U.S. Cl.
CPC ................ *B64D 37/04* (2013.01); *B64C 7/00* (2013.01)

(58) Field of Classification Search
CPC ........ B64D 37/00; B64D 37/02; B64D 37/04; B64D 37/06; B64D 37/08; B64D 37/30; B64G 1/402
See application file for complete search history.

(56) References Cited

U.S. PATENT DOCUMENTS

| 4,913,380 A | 4/1990 | Vardaman et al. |
| 2004/0129836 A1 | 7/2004 | Seidel |
| 2004/0245382 A1 * | 12/2004 | Nozaki ................... B64D 37/04 244/53 R |
| 2005/0230554 A1 * | 10/2005 | Schoene ................. B64D 37/04 244/135 R |
| 2008/0149767 A1 * | 6/2008 | Burgess .................. B64D 37/04 244/119 |
| 2008/0230654 A1 * | 9/2008 | Velicki .................... B64D 37/04 244/135 R |

(Continued)

FOREIGN PATENT DOCUMENTS

| CN | 107972877 A | 5/2018 |
| DE | 102015008178 A1 * | 2/2017 |

(Continued)

OTHER PUBLICATIONS

Translation of DE 102015008178 A1 (Year: 2017).*

(Continued)

*Primary Examiner* — Joshua J Michener
*Assistant Examiner* — Ryan Andrew Yankey
(74) *Attorney, Agent, or Firm* — Barnes & Thornburg LLP

(57) ABSTRACT

A hydrogen-fuelled aircraft 200 comprises a fuselage, wings and a plurality of cylindrical elongate hydrogen storage tanks mounted on the exterior of the fuselage and disposed vertically above a plane containing the wing-tips of the aircraft. An aerodynamic fairing forms a continuous air-washed surface of the aircraft together with a lower portion of the fuselage. The hydrogen storage tanks extend generally parallel to the fuselage and are contained between the fairing and the fuselage. The aircraft provides for storage of a large volume of compressed hydrogen without compromising the volume of usable space within the fuselage. The aircraft is able to carry out flight missions comparable in range and payload to those of an equivalent conventionally-fuelled aircraft.

6 Claims, 3 Drawing Sheets

(56) References Cited

U.S. PATENT DOCUMENTS

| | | | | |
|---|---|---|---|---|
| 2009/0189021 A1* | 7/2009 | Hasmann | | B64D 37/32 244/135 R |
| 2012/0247082 A1* | 10/2012 | Orona | | F02K 9/42 60/200.1 |
| 2014/0175218 A1* | 6/2014 | Gallant | | B64C 1/00 244/118.1 |
| 2014/0339367 A1* | 11/2014 | Sankrithi | | B64D 37/04 244/135 R |
| 2015/0336680 A1* | 11/2015 | Schumacher | | F17C 3/00 244/135 B |
| 2023/0184382 A1* | 6/2023 | Gross | | B64D 37/04 220/560.11 |
| 2023/0249818 A1* | 8/2023 | Ermanoski | | G05D 1/102 244/6 |

FOREIGN PATENT DOCUMENTS

| | | | | |
|---|---|---|---|---|
| EP | 0214767 | A2 | 3/1987 | |
| EP | 2749493 | A1 | 7/2014 | |
| EP | 4124568 | A1 * | 2/2023 | ............ B64C 7/00 |
| EP | 4124577 | A1 * | 2/2023 | ............ B64C 1/061 |
| FR | 3100798 | A1 * | 3/2021 | ............ B64D 37/00 |
| GB | 2591253 | A * | 7/2021 | ............ B64D 37/04 |
| GB | 2591255 | A * | 7/2021 | ............ B64C 7/00 |
| WO | 2008102278 | A2 | 8/2008 | |
| WO | WO-2008102278 | A2 * | 8/2008 | ............ B64C 1/061 |
| WO | 2012013351 | A1 | 2/2012 | |
| WO | 2021148335 | A1 | 7/2021 | |

OTHER PUBLICATIONS

Khandelwal, et al., "Hydrogen powered aircraft: The future of air transport", Progress in Aerospace Sciences, Oxford, GB, vol. 60, Jan. 22, 2013, pp. 45-59, ISSN: 0376-0421.

European Search report dated May 10, 2022, issued in EP Patent Application No. 21215797.

Great Britain search report dated May 28, 2021, issued in GB Patent Application No. 2100665.5.

Great Britain search report dated Jul. 29, 2021, issued in GB Patent Application No. 2100665.5, claims 6-7.

Great Britain search report dated Jul. 29, 2021, issued in GB Patent Application No. 2100665.5, claims 12-14.

Great Britain search report dated Jul. 29, 2021, issued in GB Patent Application No. 2100665.5, claims 15-17.

* cited by examiner

AIRCRAFT WITH HYDROGEN STORAGE TANKS

CROSS-REFERENCE TO RELATED PATENT APPLICATIONS

This application is based upon and claims the benefit of priority from British Patent Application No. GB 2100665.5, fled on Jan. 19, 2021, the entire contents of which are herein incorporated by reference.

BACKGROUND

Technical Field

The embodiment relates to an aircraft having hydrogen storage tanks, especially tanks for storage of gaseous hydrogen to be used as a fuel for aircraft propulsion, for example by use in a fuel cell system and/or a hydrogen-burning gas turbine engine.

Description of Related Art

Use of hydrogen as a fuel in transport applications, including aeronautical applications, is of interest due to the absence of carbon dioxide generation at the point of use. However, storage of gaseous hydrogen on an aircraft requires a significantly greater fuel storage volume compared to that of a conventional aircraft. For many flight missions, conventional aircraft designs are therefore not appropriate for hydrogen-fuelled aviation. If a conventional aircraft is fitted with hydrogen storage tanks, the usable volume within the aircraft's interior is substantially reduced if the aircraft is intended to maintain its original range and payload.

SUMMARY

According to an example, an aircraft comprises a fuselage and first, second and third elongate hydrogen storage tanks mounted to the exterior of the fuselage and extending parallel thereto, the aircraft further comprising an aerodynamic fairing, the aerodynamic fairing and the fuselage enclosing the hydrogen storage tanks.

The first, second and third hydrogen storage tanks may be disposed vertically above a horizontal plane containing the wing tips of the aircraft, with the aircraft on the ground or in level flight.

The first, second and third hydrogen storage tanks may be cylindrical, the first and second hydrogen tanks having a first diameter and being mounted in contact with the exterior of the fuselage adjacent first and second wings of the aircraft respectively, the aircraft further comprising a fourth cylindrical hydrogen storage tank, the third and fourth cylindrical hydrogen storage tanks having a second diameter less than the first diameter and being mounted to the exterior of the fuselage adjacent the first and second hydrogen storage tanks respectively.

Alternatively, the first hydrogen storage tank may be mounted to the exterior of the fuselage at top dead-centre thereof. In this case, the second and third hydrogen storage tanks may each be mounted in contact with the first hydrogen storage tank on a respective lateral side thereof. The first, second and third hydrogen storage tanks may be cylindrical, the second and third hydrogen storage tanks having a common diameter less than the diameter of the first hydrogen storage tank. The aircraft may further comprise fourth and fifth cylindrical elongate hydrogen storage tanks mounted to the fuselage in contact with the second and third hydrogen storage tanks respectively, the fourth and fifth hydrogen storage tanks having a common diameter less than that of the second and third cylindrical hydrogen storage tanks.

The first, second and third hydrogen storage tanks may be comprised in a set of like hydrogen storage tanks each mounted to the exterior of the fuselage, the set extending completely azimuthally and contiguously around the fuselage. In this case, the hydrogen storage tanks of the set may each be cylindrical and have a common diameter. Alternatively, each hydrogen storage tank may have cylindrical arcuate inner and outer portions extending between first and second azimuthal positions with respect to the fuselage, and first and second planar portions connecting the cylindrical arcuate portions at the first and second azimuthal positions respectively, with the inner arcuate portion being in contact with the exterior of the fuselage; the tanks are optionally integrated in a single multiple-tank structure.

The aircraft may comprise at least one of a hydrogen-fuelled fuel-cell system and a hydrogen-burning gas turbine engine, and a conveying system arranged to convey hydrogen from the hydrogen storage tanks to the hydrogen fuel-cell and/or the hydrogen-burning gas turbine engine.

BRIEF DESCRIPTION OF THE DRAWINGS

Embodiments are described below by way of example only and with reference to the accompanying drawings in which.

DETAILED DESCRIPTION

Figure 1:
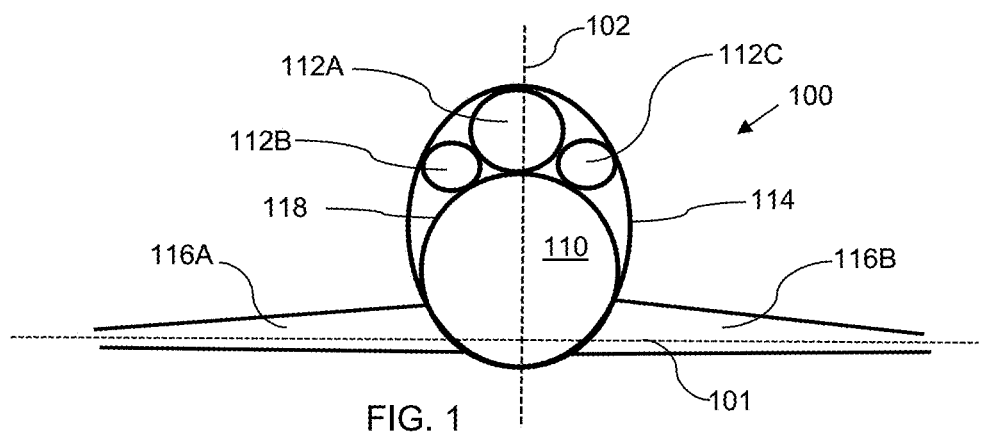
FIG. 1 shows a transverse cross-section of the first example aircraft.
Figure 2:
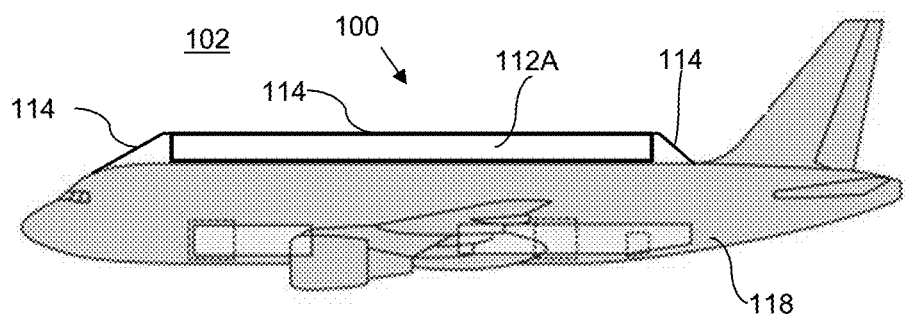
FIG. 2 shows a longitudinal cross-sections of the aircraft of FIG. 1.

Referring to FIGS. 1 and 2, a first example aircraft 100 comprises a fuselage 118, wings 116A, 116B, first, second and third elongate generally cylindrical hydrogen storage tanks 112A. 112B, 112C mounted on and extending generally parallel to the fuselage 118 and an aerodynamic fairing 114 which, together with the fuselage 118, encloses the hydrogen storage tanks 112A, 112B, 112C and provides a continuous external air-washed surface of the aircraft 100. With the aircraft on the ground or in level flight, a vertical plane 102 longitudinally bisects both the fuselage 118 and the first hydrogen storage tank 112A, i.e. the first hydrogen storage tank 112A is mounted on the fuselage 118 at top dead-centre thereof. A horizontal plane 101 includes the tips of the wings 116A, 116B. The first, second and third tanks 112A, 112B, 112C are each mounted on the fuselage 118 vertically above the plane 101. The fairing 114 extends fore and aft of the hydrogen storage tanks 112A, 112B, 112C as shown in FIG. 2. The interior 110 of the fuselage 118 provides a space for passengers and/or cargo in use of the aircraft 100. The second 112B and third 112C tanks have a common diameter smaller than that of the first tank 112A and are each mounted on the exterior of the fuselage 118 on a respective lateral side of the first tank 112A. The second 112B and third 112C tanks are in contact with the first tank 112A, but in other examples may be separated in azimuth from the first tank 112A with respect to the fuselage 118.

Figure 3:
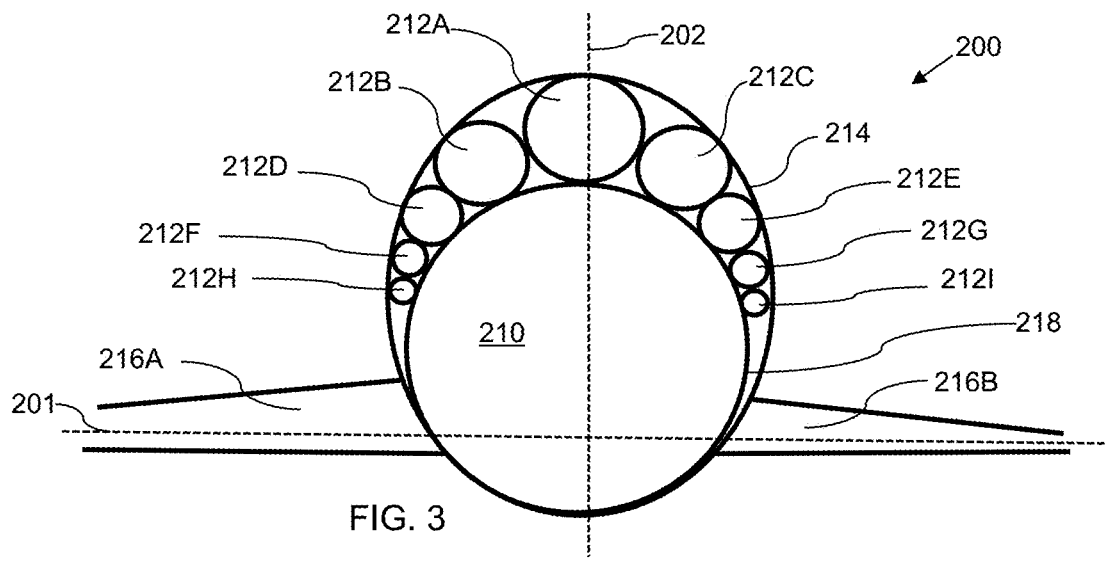
FIG. 3 shows a transverse cross-section of the second example aircraft.

FIG. 3 shows a second example aircraft 200 which is similar to the aircraft 100 of FIGS. 1 and 2. Parts of the aircraft 200 of FIG. 3 are labelled with reference numerals differing by 100 from those labelling corresponding parts in FIGS. 1 and 2. The aircraft 200 comprises a first elongate generally cylindrical hydrogen storage tank 212A mounted on and extending generally parallel to fuselage 218 at top dead-centre thereof and first 212B, 212C, second 212D, 212E, third 212F, 212G and fourth 212H, 212I pairs of elongate generally cylindrical hydrogen storage tanks, the pairs having respective diameters which decrease moving azimuthally away from the first tank 212A with respect to the fuselage 218, and which are each smaller than the diameter of the first tank 212A. The first, second, third and fourth pairs of tanks 312B, 312C, 312D, 312E, 312F, 312G, 312H, 312I also extend generally parallel to the fuselage 218. The hydrogen storage tanks 212A-I are mounted to the fuselage 218 vertically above a horizontal plane 201 containing the tips of wings 216A, 216B. Aerodynamic fairing 214 and fuselage 218 enclose the hydrogen storage tanks 212A-1 and provide a continuous external air-washed surface of the aircraft 200.

Figure 4:
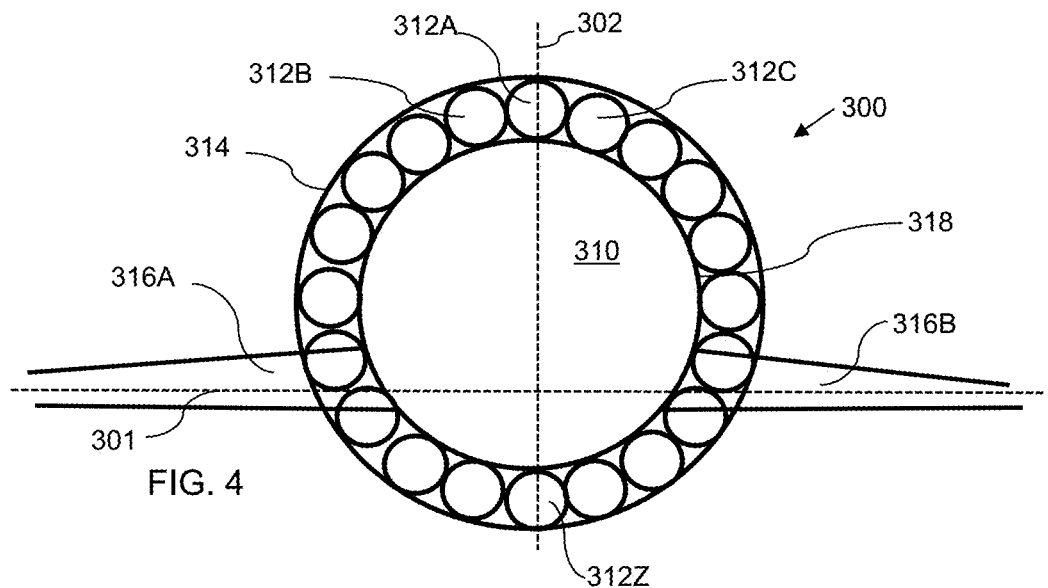
FIG. 4 shows a transverse cross-section of the third example aircraft.
Figure 5:
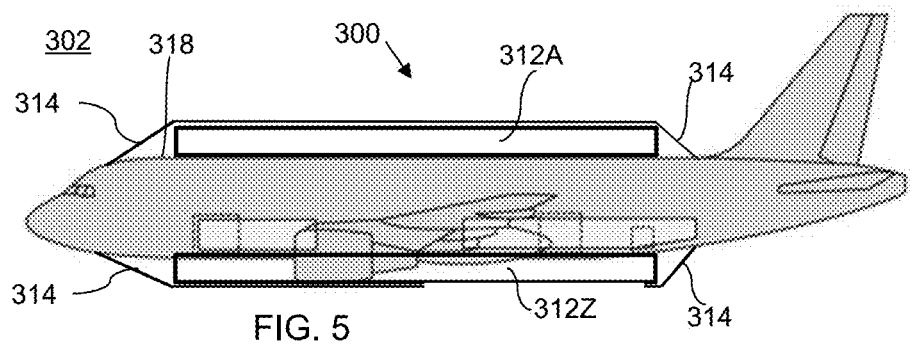
FIG. 5 show longitudinal cross-sections of the aircraft of FIG. 4.

FIGS. 4 and 5 show a third example aircraft 300 having a fuselage 318, wings 316A, 316B and a plurality of like elongate cylindrical hydrogen storage tanks such as 312A, 312B, 312C each mounted on and extending generally parallel to the fuselage 318 within a fairing 314 such that the tanks are contiguous in azimuth with respect to the fuselage 318 and completely surround the fuselage 318. Tank 312A is mounted on the fuselage 318 at top dead-centre such that, with the aircraft 300 on the ground or in level flight, a vertical plane 302 which longitudinally bisects the fuselage 318 also longitudinally bisects the tank 312A. Horizontal plane 301 contains the tips of wings 316A, 316B. A hydrogen storage tank 312Z is mounted to the fuselage 318 at bottom dead-centre thereof. The interior 310 of the fuselage 318 provides space for passengers and/or cargo.

Figure 6:
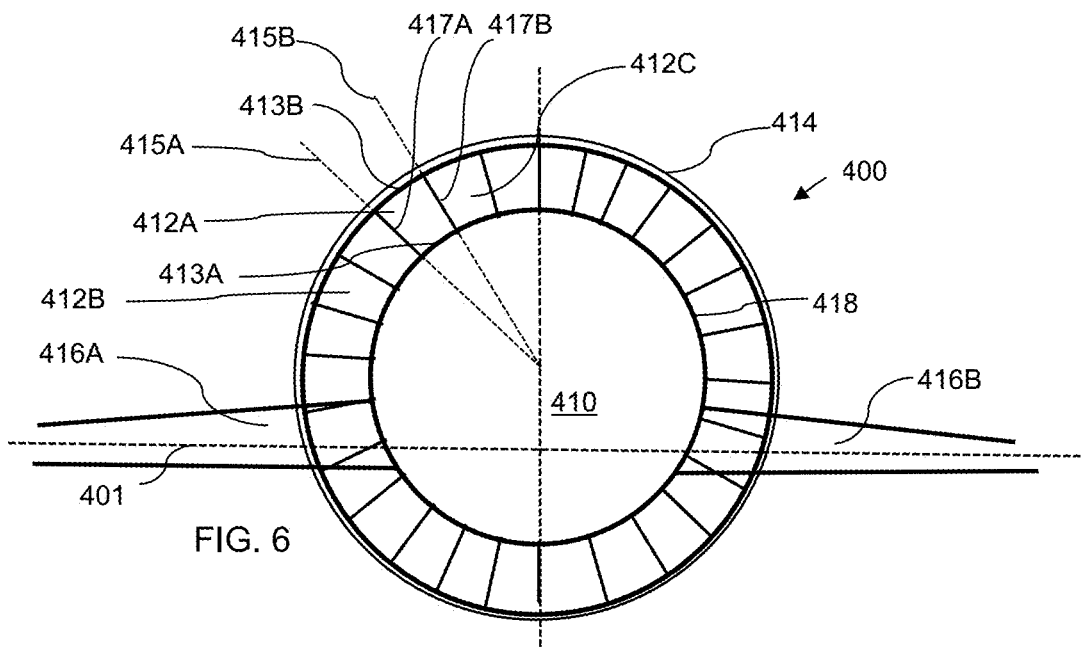
FIG. 6 shows a transverse cross-section of the fourth example aircraft.

FIG. 6 shows a transverse cross-section of a fourth example aircraft 400, the aircraft 400 comprising fuselage 418, wings 416A, 416B and plurality elongate hydrogen storage tanks such as 412A mounted on the exterior of the fuselage 418, each tank being in contact with two other tanks which are adjacent in azimuth with respect to the fuselage 418, the tanks extending completely azimuthally around the fuselage 418. Tanks 412B, 412C are adjacent in azimuth to tank 412A. With the aircraft on the ground or in level flight, vertical plane 402 longitudinally bisects the fuselage 418. Tank 412A comprises inner and outer arcuate cylindrical portions 413A, 413B which extend between azimuthal positions 415A, 415B, the inner portion 413A being in contact with the fuselage 418, and planar portions 417A, 417B at the azimuthal positions 415A, 415B respectively, each of which connects the inner and outer arcuate portions 413A, 413B at a respective azimuthal position 415A, 415B. The hydrogen storage tanks are enclosed by a fairing 414 and the fuselage 418.

In a first variant of the aircraft 400 of FIG. 6, fewer tanks are provided and each tank is spaced apart in azimuth from two neighbouring tanks. In a second variant, contiguous individual hydrogen storage tanks are integrated in a single, multi-tank structure.

Figure 7:
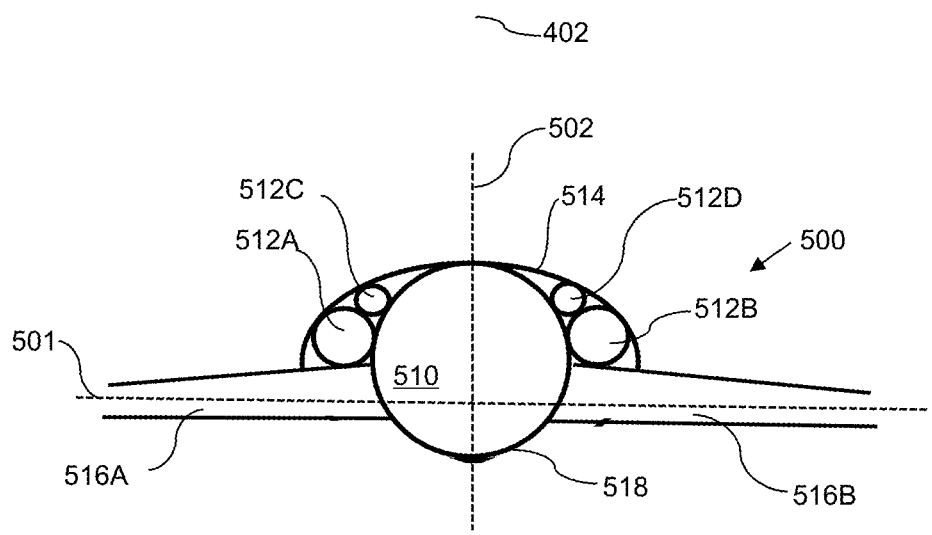
FIG. 7 shows a transverse cross-sections of the fifth example aircraft.

FIG. 7 shows a transverse cross-section of a fifth example aircraft 500, the aircraft 500 comprising a fuselage 518, wings 516A, 516B, a first pair of like elongate cylindrical hydrogen storage tanks 512A, 512B having a first diameter, a second pair of like elongate cylindrical hydrogen storage tanks 512C, 512D having a second diameter smaller than the first diameter and an aerodynamic fairing 514. Each of the tanks 512A, 512B is mounted to the exterior of the fuselage 518 and is in contact with a respective wing 516A, 516B of the aircraft 500. Tanks 512C, 512D are each mounted in contact with the fuselage 518 of the aircraft 500 and in contact with a respective one of the tanks 512A, 512B. The fairing 514 encloses the hydrogen storage tanks 512A, 512B, 512C, 512D and forms a continuous air-washed surface together with a lower portion of the fuselage 518, except at the position of the wings 516A, 516B. The fairing 518 has portions fore and aft of the hydrogen storage tanks 512A-D as in the case of the fairing 114 of the aircraft 100 of FIGS. 1 and 2. With the aircraft 500 on the ground or in level flight, vertical planes 502 bisects the fuselage 518; horizontal plane 501 contains the tips of the wings 516A, 516B.

What is claimed is:

1. An aircraft comprising:
    a fuselage configured to provide a space for at least one of passengers and cargo in the space, the fuselage having a first lateral side and a second lateral side opposite the first lateral side relative to a vertical plane that extends through the fuselage,
    a fairing arranged around the fuselage and configured to reduce drag experienced by the aircraft, the fairing having a first lateral side and a second lateral side opposite the first lateral side relative to the vertical plane, and the fuselage and the fairing cooperate to provide a continuous air-washed surface of the aircraft, and
    a plurality of cylindrical tanks located between and extending parallel to the fairing and the fuselage and configured to store gaseous hydrogen, the plurality of cylindrical tanks contacting an outer surface of the fuselage that faces toward the fairing and an inner surface of the fairing that faces toward the fuselage, the plurality of cylindrical tanks including a first tank aligned with the vertical plane, a second tank between the fuselage and the fairing and located on the first lateral side of the fuselage and the fairing relative to the vertical plane, and a third tank between the fuselage and the fairing and located on the second lateral side of the fuselage and the fairing relative to the vertical plane such that the plurality of cylindrical tanks are arranged along a curved path around the fuselage to reduce a wetted area of the fairing exposed to an external airflow so that drag experienced by the aircraft is reduced,
    wherein the first tank has a first diameter, the second tank has a second diameter, and the third tank has a third diameter, the first diameter is greater than the second diameter and the third diameter, and the second diameter is equal to the third diameter,
    wherein the plurality of cylindrical tanks further includes a fourth tank between the fuselage and the fairing and located on the first lateral side of the fuselage and the fairing relative to the vertical plane and a fifth tank between the fuselage and the fairing and located on the second lateral side of the fuselage and the fairing relative to the vertical plane.

2. The aircraft of claim 1, wherein the fourth tank has a fourth diameter, the fifth tank has a fifth diameter, the fourth diameter is equal to the fifth diameter, and the fourth diameter and the fifth diameter are less than the second diameter and the third diameter.

3. The aircraft of claim 2, wherein the plurality of cylindrical tanks further includes a sixth tank between the fuselage and the fairing and located on the first lateral side of the fuselage and the fairing relative to the vertical plane and a seventh tank between the fuselage and the fairing and located on the second lateral side of the fuselage and the fairing relative to the vertical plane.

4. The aircraft of claim 3, wherein the sixth tank has a sixth diameter, the seventh tank has a seventh diameter, the sixth diameter is equal to the seventh diameter, and the sixth diameter and the seventh diameter are less than the fourth diameter and the fifth diameter.

5. The aircraft of claim 4, wherein the plurality of cylindrical tanks further includes an eighth tank between the fuselage and the fairing and located on the first lateral side of the fuselage and the fairing relative to the vertical plane and a ninth tank between the fuselage and the fairing and located on the second lateral side of the fuselage and the fairing relative to the vertical plane, and wherein the eighth tank has an eighth diameter, the ninth tank has a ninth diameter, the eighth diameter is equal to the ninth diameter, and the eighth diameter and the ninth diameter are less than the sixth diameter and the seventh diameter.

6. An aircraft comprising:
   a fuselage configured to provide a space for at least one of passengers and cargo in the space, the fuselage having a first lateral side and a second lateral side opposite the first lateral side relative to a vertical plane that extends through the fuselage,
   a fairing arranged around the fuselage and configured to reduce drag experienced by the aircraft, the fairing having a first lateral side and a second lateral side opposite the first lateral side relative to the vertical plane, and the fuselage and the fairing cooperate to provide a continuous air-washed surface of the aircraft, and
   a plurality of cylindrical tanks located between and extending parallel to the fairing and the fuselage and configured to store gaseous hydrogen, the plurality of cylindrical tanks contacting an outer surface of the fuselage that faces toward the fairing and an inner surface of the fairing that faces toward the fuselage, the plurality of cylindrical tanks including a first tank aligned with the vertical plane, a second tank between the fuselage and the fairing and located on the first lateral side of the fuselage and the first lateral side of the fairing relative to the vertical plane, and a third tank between the fuselage and the fairing and located on the second lateral side of the fuselage and the second lateral side of the fairing relative to the vertical plane such that the plurality of cylindrical tanks are arranged along a curved path around the fuselage,
   wherein the first tank has a first diameter, the second tank has a second diameter, and the third tank has a third diameter, the first diameter is greater than the second diameter and the third diameter, and the second diameter is equal to the third diameter such that the plurality of cylindrical tanks are arranged along the curved path around the fuselage with each tank of the plurality of cylindrical tanks having a progressively smaller diameter compared to the first tank as each tank is arranged along the curved path to reduce a wetted area of the fairing exposed to an external airflow so that drag on the aircraft is reduced, and
   wherein the plurality of cylindrical tanks are located vertically above a horizontal plane containing wing tips of the aircraft and the fairing extends outwardly away from the fuselage at the horizontal plane to provide a cavity between the fairing and the fuselage to locate the plurality of cylindrical tanks therebetween.

* * * * *